Sept. 22, 1970     C. F. SCHROEDER     3,530,499

ELECTRICALLY HEATED APPLIANCE UNIT

Original Filed Feb. 27, 1967     2 Sheets-Sheet 1

INVENTOR.
CHARLES F. SCHROEDER
BY
Charles F. Schroeder
ATTORNEY

Sept. 22, 1970     C. F. SCHROEDER     3,530,499
ELECTRICALLY HEATED APPLIANCE UNIT
Original Filed Feb. 27, 1967     2 Sheets-Sheet 2
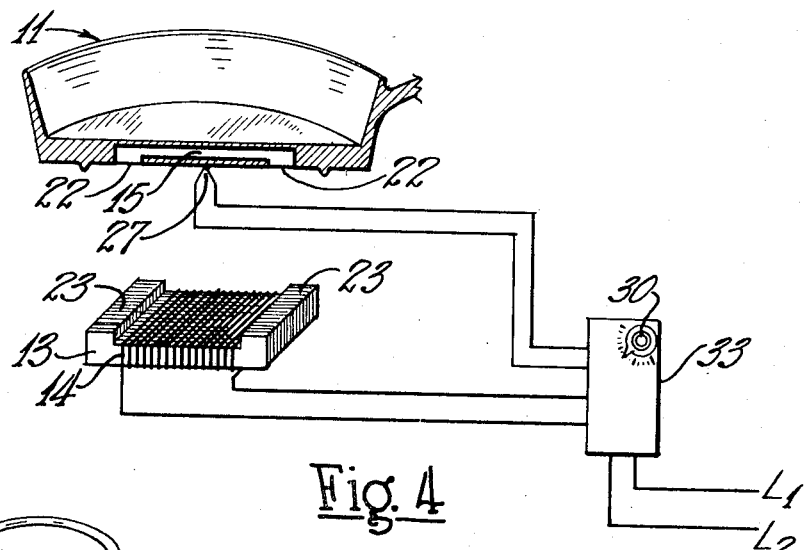
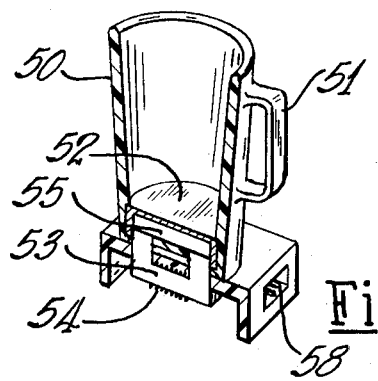
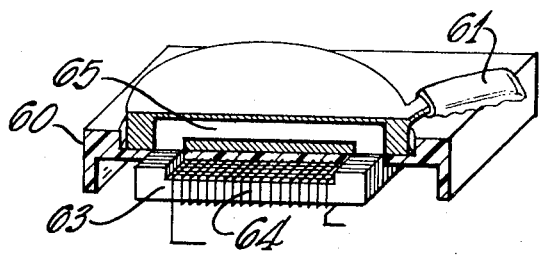
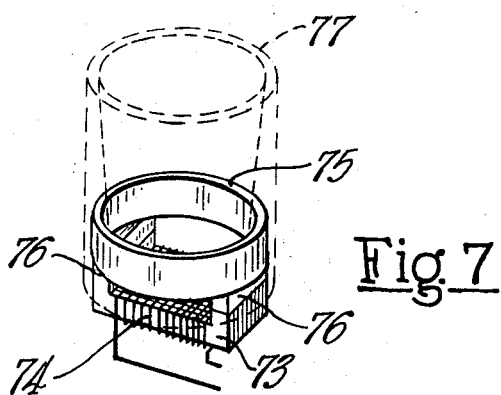
INVENTOR.
CHARLES F. SCHROEDER
BY
Charles F. Schroeder
ATTORNEY

United States Patent Office 3,530,499
Patented Sept. 22, 1970

3,530,499
ELECTRICALLY HEATED APPLIANCE UNIT
Charles F. Schroeder, 2317 Valleybrook Drive,
Toledo, Ohio 43615
Continuation of application Ser. No. 618,785, Feb. 27,
1967. This application Sept. 29, 1969, Ser. No. 863,679
Int. Cl. H05b 1/02, 5/00
U.S. Cl. 219—10.49          9 Claims

ABSTRACT OF THE DISCLOSURE

An electrically heated appliance unit heated by a short circuited secondary about a magnetic core passing therethrough. Electrical energization of the magnetic core for the appliance is accomplished on a portion of the magnetic circuit physically separable from the appliance. The appliance is adapted to being controlled in temperature by a communicating temperature sensing element interconnected with preadjustable controls regulating the energy imparted to the magnetic circuit. Features of the construction are rapid heating of the unit, no need for electrical connections to the appliance, and adaptability of the appliance to liquid immersibility for cleaning purposes.

---

This application is a continuation of application No. 618,785, filed Feb. 27, 1967, now abandoned.

BACKGROUND OF THE INVENTION

Field of the invention

This invention is related to electrical heat units, and more particularly to appliances incorporating electromagnetic circuits in which the electrical energization of such circuits is accomplished in a portion of the magnetic circuit separable from the appliance.

Description of the prior art

Electrically heated appliances in most instances are heated by high resistance circuits incorporated directly into the appliance unit and are thermally controlled by instrumentation also incorporated in the unit. This direct incorporation of heating elements and sensitive instrumentation in the unit frequently presents a cleaning problem in that the appliance does not lend itself to immersion in liquid for cleaning purposes. The structural arrangement of the present invention, however, overcomes this difficulty in making the energization source as well as instrumentation for the appliances separable from the appliances.

Another difficulty in present day electrically heated appliances is the time required to bring the appliance to desired operating temperature. In view of the ever-increasing need for more instant service, and particularly in the handling of instant foods where warm-up time becomes an appreciable time of preparation, a saving in time amounting to mere seconds becomes important. To this end the present invention provides a quicker thermal response and attainment of desired thermal levels by making the appliance itself the heating element which upon electrical energization is heated directly and immediately rather than requiring time for transfer of heat energy from a different heat source, which although likely to be integral with, still requires heat transfer time by thermal conductivity.

Still another object of the present invention is to provide a method and means for generating heat in electrical appliances without the need for direct incorporation in the appliance of delicate elements for either generation of such heat or control of the temperature level desired.

In other words, it is an object of the invention to provide a novel heating arrangement adaptable to use in modern day appliances which is much more rugged and less susceptible to damage than arrangements heretofore available.

In a broad sense, the invention lies in the provision of an electromagnetic arrangement for heating appliances.

SUMMARY OF THE INVENTION

In brief, the objectives of this invention are attained in a structural arrangement in which the electrically conductive portions of appliance units such as frypans, pots, kettles, coffee makers, deep fryers, hot plates, or even cups and bottles such as baby bottles, are heated directly by making portions of the units themselves the resistance elements in which the $I^2R$ or power dissipation occurs, while the electrical source for such power is in a convenient but separable section adaptable to providing a common source of power for a variety of different types of matching appliances. In general, the heating system incorporating the principles of this invention is a magnetic loop circuit separable into at least two sections in which energy is provided through the loop by an electrical winding on one of such sections separable from the appliance itself. Another section of the magnetic loop is incorporated in an electrically conductive portion of the appliances such that the electrically conductive portion acts as a short circuited secondary about the magnetic section incorporated therein. In this regard, the part of the magnetic loop incorporated in the appliance is usually in a wall portion, such as a bottom or side wall of the appliance where heat generation is conveniently possible and most desired.

For selective concentration of the heat on the interior of a unit, the interior wall portion of the secondary circuit surrounding the loop is made smaller in cross-sectional dimension than the exterior of the appliance, thereby promoting concentration of heat on the interior of the wall portion as distinguished from its exterior. The portion of the magnetic loop incorporated in the appliance is adapted to being mated with the remaining and usually underlying magnetic portion of the loop on which the energizing winding is wound. Upon energization of the primary winding, the magnetic flux extends through the electrical current conductive wall portion of the appliance by way of the magnetic circuit extending therethrough and electrical currents are generated in the wall portions, thereby generating a high $I^2R$ loss in the wall, and consequently heating the wall directly.

Thermal sensing and regulation elements are electrically associated with the primary section of the unit but are arranged for thermal communication with the appliance by contacting elements such as a thermocouple, a thermister, a thermostat, or any of a number of other suitable thermo-sensing elements.

A feature of the invention lies in the fact that heat is generated in the appliance unit itself without need for adapting separate high resistance elements thereto and the fact that heat is generated in the unit alone while the portion of the system supplying the electromagnetic energy remains cool.

A further feature is that electrical heating current is generated in the appliance by an inductive coupling requiring no mechanical connections between the electric energy supply and the appliance.

Another feature of the invention lies in the adaptability of the system to control the electric energy supplied in portions of the arrangement separate from the appliance itself. That is, the temperature of the appliance can be sensed by instrumentation electrically connected and physically associated with the power source separate from the appliance, rather than with the appliance itself, yet being adapted to sense and closely regulate the temperature of the appliance.

Still another feature of the invention lies in the possibility of maintaining the power source energized constantly with negligible consumption of power until the appliance unit is brought into communication with the electrically energized portion to complete the magnetic circuit for the system.

A still further feature is the holding force exerted by the magnetic circuit to hold the appliance in a stable position when the appliance is energized.

Another feature of the invention is that a single source of electromagnetic energy can be utilized to provide heat energy to any of a variety of appliances designed for association therewith.

A still further and no less important feature lies in the adaptability of the appliances of this invention to being immersed in liquids for cleaning without danger of sensitive elements being damaged.

Another feature of the invention lies in the possibility of close thermal control of appliances even though thermal elements or instrumentation are not incorporated directly into the unit.

Other objects and features which I believe to be characteristic of my invention are set forth with particularity in the appended claims. My invention, however, both in organization and manner of construction, together with further objects and advantages thereof, may be best understood by reference to the following description taken in connection with the accompanying drawings.

BRIEF DESCRIPTION OF THE DRAWINGS

FIG. 4 illustrates schematically the arrangement of controls for the heating system of FIGS. 1–3 showing a temperature sensor sensing the temperature of the appliance and associated with a circuit and for controlling the amount of energy supplied to the appliance to establish the desired temperature level;

FIG. 5 is a view of a drinking cup embodying the principles of the invention;

FIG. 6 is a view of a surface heater or hot plate embodying the principles of the invention;

FIG. 7 illustrates schematically another magnetic core circuit arrangement adaptable to incorporation in appliance units according to the principles of this invention.

DESCRIPTION OF THE PREFERRED EMBODIMENTS

Figure 1:
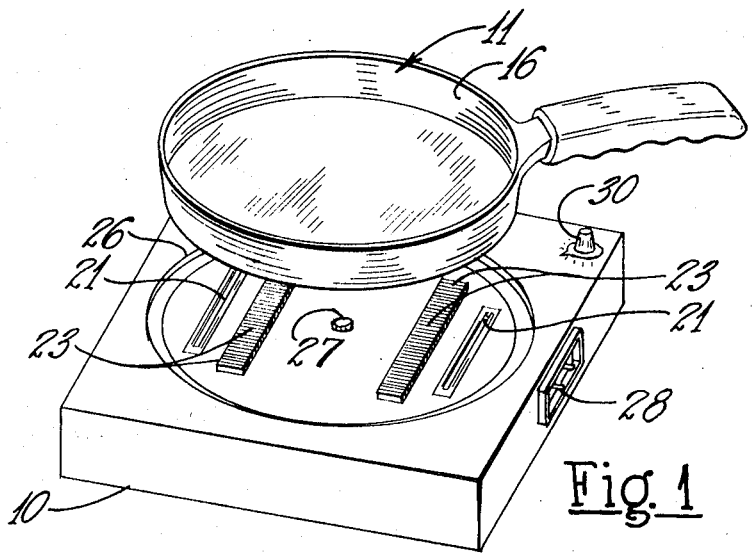
FIG. 1 is an over-all perspective view of a frying pan unit and its separate electromagnetic energy source incorporating the principles of the present invention.

Referring to the drawings in greater detail, FIG. 1 shows a heating unit embodying the principles of the present invention wherein an electromagnetically heated appliance exemplified by a frying pan 11 is cooperatively designed for energization by a magnetic circuit which in turn is electrically energized in a base portion 10.

Figure 2:
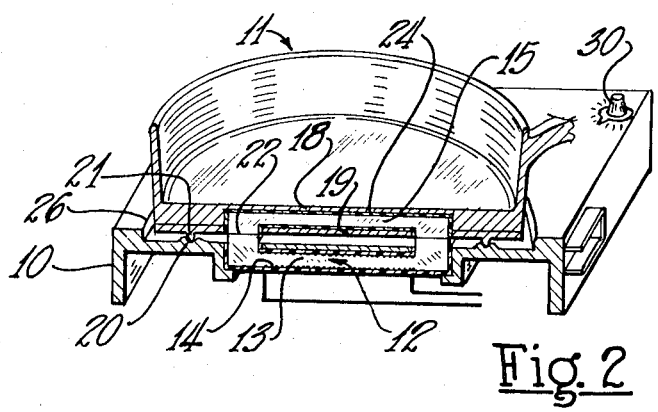
FIG. 2 is a cross-sectional view of the frying pan unit of FIG. 1 seated on its electromagnetic energy source to complete the magnetic loop circuit therethrough.

FIG. 2 shows in more detail the general arrangement of elements of the unit and illustrates the manner in which the magnetic circuit is completed by placing the frying pan 11 on the base 10. Although shown here with the frying pan in place on the base as an individual unit of somewhat portable character, it will be recognized as the description progresses that a unit of this type can also be conveniently incorporated in one or a number of positions of an electrical range in a manner similar to that in which heating resistance units are incorporated in present day electrical heating ranges.

The frying pan 11 is made of electrically conductive metal such as aluminum or copper. Although the metal may be of non-magnetic material, it can also be magnetic material such as steel and iron. In the latter instance, not only the conductive property of the metal is used to heat the appliance, but also its magnetic hysteresis and eddy current properties.

The bottom 17 of the frying pan is sufficiently thick to incorporate therein a magnetic core 15 such as a series of laminations stacked side-by-side and extending through the thickness of the bottom 17 with the conductive material of the pan bottom extending around the cross section of the core 15, Thus, when the core 15 is energized magnetically, the bottom of the container acts as a short-circuited secondary loop about the core and is heated accordingly.

In passing through the frying pan bottom 17, the core 15 can be located closer to the upper region of the bottom wall so that the portion 18 of the thickness above the core 15 is somewhat less than the portion 19 under the core and in this way the resistance of the short-circuited loop about the core is greater nearer the interior surface where it is desired to concentrate heat for the frying pan. In other words, the short-circuited path about the core is smaller in cross sectional area in the region 18 overlying the core than the area of the underlying portion 19 below the core, thereby providing greater resistance and accordingly a greater electrical loss and greater generation of heat in the interior zone desired to be heated than at the bottom of the pan.

Figure 3:
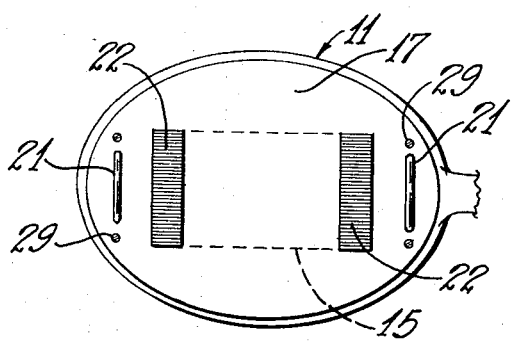
FIG. 3 is a bottom plan view of the frypan unit of FIGS. 1 and 2 showing in dotted lines the orientation of the magnetic core section extending therethrough.

The plan view of the frying pan in FIG. 3 shows the magnetic core 15 in the frying pan bottom 17 extending across the width of the pan to provide the conductive path over an area of the interior of the frying pan to distribute the area over which heat is generated in the frying pan. The core 15 is provided with two end faces 22 generally parallel to the exterior surface of the bottom 17 of the frying pan located for association with matching faces 23 of an energizing core portion of the magnetic circuit 13 with which a primary winding 14 is associated for translation of electrical energy into alternating magnetic flux. Core portion 15 in the frying pan is, of course, suitably insulated from the electrically conductive bottom of the frying pan with an electrical insulation material 24 such as a resinous sealing material, for example an epoxy resin, which fills the voids in the core cavity extending through the frying pan bottom. Other suitable high temperature electrical insulation material such as asbestos or fibrous glass insulation can also be interposed between the core and the conductive portions of the pan.

The core can be enclosed within the bottom of the pan by provision of a bottom plate integrally joined to the frying pan such as by screws 29. In this way, the bottom exterior surface is removably joined to the frying pan and the core 13 can be inserted in place and suitably insulated, and the plate can thereafter be joined to the frying pan to provide the bottom. Alternately, or in addition, the top part of the conductive circuit, or the interior of the frying pan can be a separable plate integrally joined to the frying pan by screws extending from below and joining the plate to the pan.

The housing or base portion 10 of the unit which is electrically energized by power supplied through a plug 28 can be made of suitable material such as metal plate or molded plastic, or even wood, to support and house the energizing portion of the magnetic circuit. The housing holds the core portion 13 in place so that when the frying pan is placed on the base 10, its core faces 22 will be located for intimate contacting association with the base core faces 23. The magnetic circuit loop 12 for energization of the short circuit in the frying pan in thus completed. The completed circuit functions as a power transformer electrically energized by the primary winding 14 with the appliance 11 forming a short-circuited secondary. Since the resistance of the secondary is accordingly low, even a low voltage of one or two volts induced therein by the magnetic circuit causes a high current, and accordingly a high $I^2R$ loss in the appliance, resulting in rapid heating of the appliance.

No electrical wire connections are necessary between the appliance and the energizing base in order to effect energization and heating of the appliance. The frying pan bottom, however, can be provided with physical guide elements in the form of embossments such as elongated narrow projections 20 which assist in establishment of a properly matched energizing relation of the appliance with the base by way of corresponding longitudinal recesses 21 in the base. That is, the projections 21 are located on the frying pan in relation to the core faces 22 so that, upon placing the frying pan on the base 10, the projections 20 when mated with the recess 21 will establish a proper mated relationship between the appliance core faces 22 with the energizing core faces 23. The mated relationship between the two separable core portions of the magnetic loop circuit can be located in an overall recess 26 as shown.

The appliance temperature can be sensed and regulated by a contact-type temperature sensor such as a thermister or a thermocouple unit 27 centrally located between the base core faces 23 for contact with the bottom of the appliance when it is located in position to be heated. A temperature selection and off-on switch knob 30 is located in a convenient position adjacent the frying pan location for pre-selection of the temperature to which the frying pan is to be heated.

FIG. 4 shows in more schematic form the arrangement of the temperature controls for the frying pan wherein the temperature sensing element 27 is electrically connected to a control unit 33 which in turn regulates the electrical energy supplied by the base core portion 13. The control unit 33 can be a suitable commercially available control such, for example, as a silicon controlled rectifier (SCR) circuit, or such as a saturable core type circuit of the type described in Pat. 3,265,851. Still further, the energy imparted into the unit might be controlled by the voltage at energy supply lines L1, L2 while regulation control is exercised through the control unit 33.

A feature of the invention lies in the fact that the base core is fundamentally a reactive impedance or choke when not mated with the frying pan 11 and accordingly can be energized continuously without appreciable consumption of power. The unit will not effectively generate heat even though energized until the frying pan is placed in position to be heated. Upon placement of the frying pan in mated relation with the energizing core portion 13, the relatively high current flow in the short-circuited single turn frying pan bottom heats the bottom to the temperature level desired. The current and heat generated in the closed conductive loop of the frying pan are dependent upon the material of the loop. The loop besides being of the material of which the frying pan is made can also be in the form of a heater element incorporated in the bottom. The material of the pan and the heating portion can be of non-magnetic material such as stainless steel, aluminum or copper, or of magnetic material such as steel. Only the frying pan itself becomes heated and high energy is not provided by the base unit 10 until the frying pan is placed in position on the base to be heated. The temperature sensing unit 27 thereupon regulates the energy imparted to bring the temperature of the frying pan to the desired level and to maintain it at the desired temperature level until energy supply to the pan ceases.

It is to be recognized that although the temperature sensing element 27 shown is of a type which functions upon contact with the frying pan, a temperature sensing element might instead be embedded directly within the frying pan and electrically connected with the control unit 33 by way of prongs provided in the base for projection into corresponding matching apertures or recesses in the frying pan unit. Alternately, such mating terminal prongs can be provided as projections on the appliance for establishment of electrical connections by way of mating apertures in the base.

FIG. 5 illustrates another utensil embodying the principles of this invention comprising a drinking cup 50 having a handle 51 and a bottom 52 which is electrically energized through a plug 58 and heated according to the concept of this invention. The sides of the cup might be of metal or even of plastic, but the bottom of the cup incorporates an electrically conductive disk having an electrically insulated core 55 of magnetic material which is energized by the primary core portion 53 which in turn transforms electrical energy of a primary winding 54 into magnetic flux for magnetic energization of the core portion 55. With such a conductive heating disk in the bottom, the walls can be of electrically non-conductive material such as resin, for example a phenolic, or an epoxy resin. In this regard, a heating member in the form of a loop, ring, bar, strip, or disk can be incorporated in any of a number of different types of electrically conductive or nonconductive bodies or apparatus to be heated. It will be noted here that the proper placement of the cup 50 as well as other appliances on the base unit can be assured by recessing the faces of the core 55 within the bottom of the appliance so that the projections of the base core 53 fit therein and accordingly orient the appliance properly for energization.

Still another form of the invention is a surface heater illustrated in FIG. 6 where a base 60 having a primary core portion 63 is energized by a primary winding 64. The base portion is shown energizing the surface heater or hotplate 62 having a handle 61 and an insulated magnetic core 65 incorporated therein to heat the hot-plate. The plate itself is of either low-resistance conductive material as in the construction of the previous figures, but can also be magnetic to utilize hysteresis and eddy current losses as heat. By provision of such a hot-plate arrangement for association with the base portion, a heating unit is provided which is adapted to heating conventional type utensils placed thereon. FIG. 6 also illustrates that a variety of appliances can be designed for association with a single sized energizing base, for example, pots, kettles, coffee makers, deep fryers, cups, and even bottles such as baby bottles can be designed to be heated on a single base unit, each of such appliances incorporating a magnetic core surrounding a short-circuited secondary. In addition, a surface heating unit like that of FIG. 6 can be associated therewith to extend the range of use of the heating unit of the invention to other utensils and appliances as well.

FIG. 7 illustrates another structural arrangement of the magnetic core adapted to incorporation in such appliances. In this arrangement, a core 75, more in the form of a magnetic ring or complete loop, has a pair of core extensions 76 arranged for mated association with a primary core 73 energized by a primary winding 74. The core 75 as illustrated, can be incorporated in an appliance illustrated in dotted lines, the loop being located somewhat higher in the side walls of the appliance than the arrangements of the previous figures, but yet having the extensions 76 projecting down to the bottom of the appliance to provide paths for magnetic energization of the core 75. In such an arrangement, that the appliance walls can form a closed circuit secondary about the core 75 to accordingly heat the walls by the flow of a large current therein due to the low resistance of the path about the core. The bottom of the appliance 77 can be solid so as to form a complete loop extending from the outside of the core 73 and through the central region of the loop. FIG. 2 of the aforementioned Pat. 3,265,851, illustrates such an appliance having a solid bottom with a magnetic circuit passing through hollow conductive walls. The secondary core as illustrated in FIG. 5 can be a straight bar-type core, but in still another form of these appliances, the secondary core faces might be mated with the primary core faces at the sides of the appliance to be heated.

In operation, the structures of the present invention can be heated rapidly because of generation of heat directly within the body itself, while the voltage generated therein to effect this heating need only be relatively low because of the low resistance provided by the short-circuited secondary about their core. The voltage to effect heating is sufficiently low that the danger of shock is a minimum, but to reduce its possible objectionableness even further, the object itself can be coated or encased within insulating material such as epoxy or Teflon resin to encase the low voltage that is present during heating. However, during the heating cycle, the object is brought up in temperature so rapidly that the user is alerted and not likely to touch the unit anyway. Another feature of the invention is that the object to be heated is held tightly to the energizing base during heating because of the magnetic attraction established therebetween.

In view of the foregoing, it will be understood that many variations of the present invention can be provided within the broad scope of the principles embodied therein. For example, shading coils can be provided on the core faces should a core hum be experienced. Switch mechanisms associated with the control can also be provided to automatically switch the unit off when the heated body is removed from the unit. Switch means can also be connected with suitable shorting resistances, electronic valves, transistors, rectifiers, or associated electromagnetic components to reduce or eliminate transient high voltage difficulties. Still further, the magnetic circuitry involved might include a more complex multiple loop magnetic core in which the loops are branches of a main flux supply path. Such branch loops might extend to the side of a container and in various directions so as to effect generation of heat in paths surrounding the core of the loops in locations where additional heating is desired, or where heat is more positively to be generated, e.g. due to extra heat dissipation in such localities. Beside U-shaped or E-shaped cores, other multiple legged cores can be used to form the magnetic circuit, providing corresponding flexibility in adaptability to energization of a plurality of different appliance units separately or simultaneously. Still further, the primary circuitry might be a multiple branch arrangement matching spaced magnetic paths in given body to be heated. Localized heating of a body might be provided by spaced magnetic loops in the side walls of a container, all of which are in magnetic communication with a primary magnetic energizing core.

Thus, while I have shown certain particular embodiments of my invention, it will, of course, be understood that I do not wish to be limited to such embodiments alone, since many modifications may be made within the scope of my invention, and I contemplate by the appended claims to cover all such modifications as fall within the true spirit and scope of the invention.

I claim:

1. An electrically heated container unit comprising a magnetic core loop having a section of said core separable from said loop, a container comprising in its lower region a closed electrical secondary loop on said separable section, an electrical primary winding on the remaining portion of said core loop for energization of said magnetic loop, tempearture sensing means for sensing the temperature of a preselected region of said container, control means for regulating the degree of energization of said magnetic circuit by said primary winding, said control means being arranged for receipt of temperature signals from said temperature sensing means and for regulation of the effective energization of said magnetic circuit and container heat generated by said closed secondary according to signals supplied by said temperature sensing means.

2. An electrical heater unit according to claim 1 wherein said temperature sensing means is separably associated with said closed secondary loop.

3. An electrical heater unit according to claim 1 having a temperature preselection means associated with said control means for establishment of a degree of excitation of said core corresponding to a temperature of said secondary loop which will provide a temperature signal from said sensing means matched so that selected at said temperature preselection means.

4. An electrically heated container comprising electrically conducting material, a magnetic core forming a magnetic path through at least a portion of said electrically conducting material to provide an electrically conductive path of said container material surrounding said core, the resistance of the electrical path provided by the conducting material on the side of said core toward the interior of said container being greater than the resistance of the electrical path provided by the conducting material on the side of said core toward the exterior of the container, a magnetic energization means external of said container associated with said magnetic core for energization and generation of electric heating current in the material of the portion of the container surrounding said core, said container and magnetic core surrounded thereby being separable from said magnetic energization means to permit independent handling of the container after being heated.

5. An electrically heated container for heating matter inserted therein comprising a magnetic core in the form of a closed magnetic loop, said core having a section of its length separable from said magnetic loop, said container comprising a secondary heating circuit comprising an integral portion of said container forming a closed conductive path unitarily associated in surrounding relation with said separable core section, and a primary circuit associated with the remainder of said magnetic core for energization of said closed magnetic loop and generation of heat by said secondary circuit.

6. An electrical heating container unit according to claim 5 wherein said secondary circuit is closed a single turn secondary loop.

7. An electrical heating container unit according to claim 5 wherein said secondary circuit forms an integral portion of the bottom of said container.

8. An electrically heated container for heating matter contained therein comprising electrically conducting material, a magnetic core forming a magnetic path through at least a portion of said electrically conducting material to provide an electrically conductive path of said container material surrounding said core, magnetic energization means external of said container associated with said magnetic core for energization and generation of electric heating current in the material of the portion of the container surrounding said core, said container and magnetic core surrounded thereby being separable from said magnetic energization means to permit physical handling of the container independent of said energization means.

9. An electrically heated container having an opening in its upper region comprising electrically conductive material, a magnetic circuit comprising a magnetic core loop having a section of said core separable from said loop, said separable core section extending through at least a portion of the electrically conductive material of said container providing a close secondary loop of said container material about said separable core section, an electrical primary winding on the remaining portion of said magnetic circuit for energization of said magnetc loop and to generate electric heating current in the conductive container material forming said secondary about said core section.

(References on following page)

References Cited

UNITED STATES PATENTS

| | | | |
|---|---|---|---|
| 457,561 | 8/1891 | Kennedy | 219—10.49 X |
| 607,093 | 7/1898 | Snow | 219—10.49 |
| 932,242 | 8/1909 | Berry | 219—10.49 |
| 1,415,456 | 5/1922 | Larith | 219—10.49 X |
| 2,374,662 | 5/1945 | Black | 219—10.49 X |
| 2,404,147 | 7/1946 | Strickland | 219—10.77 X |
| 2,773,161 | 12/1956 | Baker | 219—10.77 |
| 2,916,593 | 12/1959 | Herrick | 219—10.77 X |
| 3,265,851 | 8/1966 | Schroeder | 219—10.79 X |

FOREIGN PATENTS

| | | |
|---|---|---|
| 621,926 | 4/1949 | Great Britain. |
| 767,905 | 7/1934 | France. |

JOSEPH V. TRUHE, Primary Examiner

L. H. BENDER, Assistant Examiner

U.S. Cl. X.R.

219—10.51, 10.77